United States Patent
Sokolov et al.

(10) Patent No.: US 11,140,145 B1
(45) Date of Patent: Oct. 5, 2021

(54) SYSTEMS AND METHODS FOR PROVIDING SINGLE SIGN-ON CAPABILITY

(71) Applicant: Symantec Corporation, Mountain View, CA (US)

(72) Inventors: Ilya Sokolov, Boston, MA (US); Keith Newstadt, West Newton, MA (US)

(73) Assignee: NortonLifeLock Inc., Tempe, AZ (US)

( * ) Notice: Subject to any disclaimer, the term of this patent is extended or adjusted under 35 U.S.C. 154(b) by 439 days.

(21) Appl. No.: 16/017,077

(22) Filed: Jun. 25, 2018

(51) Int. Cl.
*H04L 29/06* (2006.01)
*H04L 9/32* (2006.01)

(52) U.S. Cl.
CPC ........ *H04L 63/0815* (2013.01); *H04L 9/3247* (2013.01); *H04L 63/0838* (2013.01); *H04L 63/0853* (2013.01); *H04L 63/0861* (2013.01); *H04L 63/102* (2013.01)

(58) Field of Classification Search
CPC ............. H04L 63/0815; H04L 63/0861; H04L 63/0838; H04L 9/3247; H04L 63/102; H04L 63/0853
See application file for complete search history.

(56) References Cited

U.S. PATENT DOCUMENTS

| | | | |
|---|---|---|---|
| 8,850,546 B1* | 9/2014 | Field | H04L 63/102 726/8 |
| 2012/0131653 A1* | 5/2012 | Pasquero | G06F 21/42 726/6 |
| 2018/0077138 A1* | 3/2018 | Bansal | H04L 63/0815 |
| 2018/0077144 A1* | 3/2018 | Gangawane | H04L 63/10 |
| 2018/0083835 A1* | 3/2018 | Cole | H04L 41/12 |
| 2019/0081942 A1* | 3/2019 | Suresh | G06F 9/452 |
| 2019/0260733 A1* | 8/2019 | Koranda | H04L 63/083 |
| 2020/0177578 A1* | 6/2020 | Chatnalli Deshpande Sridhar | H04L 67/10 |
| 2020/0233949 A1* | 7/2020 | Xia | H04L 63/083 |

* cited by examiner

*Primary Examiner* — Theodore C Parsons
(74) *Attorney, Agent, or Firm* — FisherBroyles, LLP

(57) ABSTRACT

The disclosed computer-implemented method for providing single sign-on capability may include intercepting, during an authentication session with a network resource, a single sign-on request generated by an application executing on a computing device, redirecting the single sign-on request to a separate computing device for execution, receiving, in response to authentication of at least one user credential from the separate computing device, an authentication decision that the separate computing device obtained from an identity provider (IDP) by executing the single sign-on request and injecting the authentication decision received from the separate computing device into the application where the single sign-on request was originally generated to complete the authentication session.

20 Claims, 4 Drawing Sheets

SYSTEMS AND METHODS FOR PROVIDING SINGLE SIGN-ON CAPABILITY

BACKGROUND

Gaining access to online resources requiring user authentication has become essential to many people for work, entertainment and communications. Authenticated access to online resources is often available from various network-enabled digital devices, such as home and office desktop computers, laptops, tablets, Internet of Things (IOT) devices and mobile telephones. These digital devices are conventionally dispersed into a wide variety of environments and situations associated with different levels of individual user control and corresponding perceived trustworthiness. For example, a home desktop computer used and under control by only one user living and working in the same dwelling may be perceived as very trustworthy by that user, while a computer in a public setting like a library or coffee shop environment under constantly changing user control may garner little or no trust at all from the same user.

Although a variety of digital devices and environments exist that permit a user to access desired online resources, the use of many of these digital devices to gain access to online resources risks exposure of the user's authentication credential(s) to others. Furthermore, the greater the number of digital devices the user enters their authentication credential(s) into, the greater the risk becomes that their authentication credential(s) will be exposed. This problematic situation can force the user to make a difficult choice between foregoing access to online resources or risking loss of their authentication credential(s) required to access important and/or time-sensitive online resources.

Two factor authentication (2FA) attempts to address this problem by requiring additional authentication credentials from a presumably more trustworthy device such as the user's personal mobile phone. Unfortunately, this still risks exposing the first authentication credential(s) on a potentially far less trustworthy device. Furthermore, a one-time password (OTP) code used with 2FA may also be intercepted in some cases and improperly used to access the online resources. The instant disclosure, therefore, identifies and addresses a need for systems and methods for providing single sign-on capability.

SUMMARY

As will be described in greater detail below, the instant disclosure describes various systems and methods for providing single sign-on capability.

In one example, a method for providing single sign-on capability may include intercepting, during an authentication session with a network resource, a single sign-on request generated by an application executing on the computing device, redirecting the single sign-on request to a separate computing device for execution, receiving, in response to authentication of at least one user credential from the separate computing device, an authentication decision that the separate computing device obtained from an identity provider (IDP) by executing the single sign-on request, and injecting the authentication decision received from the separate computing device into the application where the single sign-on request was originally generated to complete the authentication session.

In one embodiment, a system for providing single sign-on capability may include at least one physical processor and physical memory that includes computer-executable instructions that, when executed by the physical processor, cause the physical processor to intercept, during an authentication session with a network resource, a single sign-on request generated by an application executing on the computing device, redirect the single sign-on request to a separate computing device for execution, receive, in response to authentication of at least one user credential from the separate computing device, an authentication decision that the separate computing device obtained from an identity provider (IDP) by executing the single sign-on request, and inject the authentication decision received from the separate computing device into the application where the single sign-on request was originally generated to complete the authentication session.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to intercept, during an authentication session with a network resource, a single sign-on request generated by an application executing on the computing device, redirect the single sign-on request to a separate computing device for execution, receive, in response to authentication of at least one user credential from the separate computing device, an authentication decision that the separate computing device obtained from an identity provider (IDP) by executing the single sign-on request, and inject the authentication decision received from the separate computing device into the application where the single sign-on request was originally generated to complete the authentication session.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
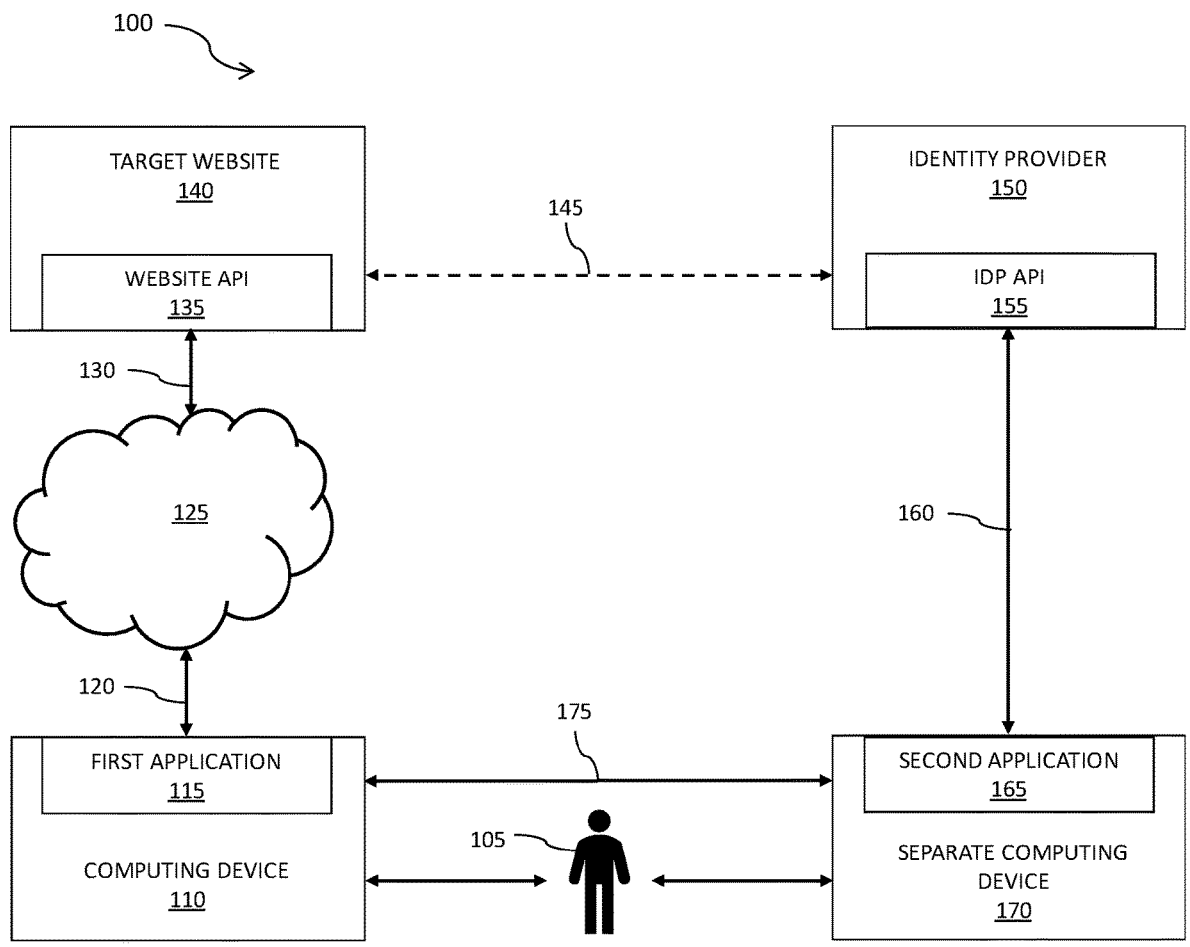
FIG. 1 is a block diagram of an example system for providing single sign-on capability.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for providing single sign-on capability. As will be explained in greater detail below, by intercepting a single sign-on request generated by an application executing on a computing device and redirecting the single sign-on request to a separate computing device for execution, a user can avoid providing or exposing at least one user credential on the computing device that may be perceived as less trustworthy by the user. Instead, the user may provide the at least one user credential on the separate computing device, which may be under greater control by the user and perceived by the user as more trustworthy with less risk of inadvertent or malicious access by another. An authentication decision that the separate computing device obtained from an identity provider (IDP) may be injected into the application where the single sign-on request was originally generated to complete the authentication session. This may mitigate and/or overcome the problems described herein associated with providing at least one authentication credential on a relatively untrustworthy computing device by enabling a more trustworthy device to handle the at least one authentication credential instead. This may provide greater confidence to a user desiring to access online resources and motivate the user to take additional care with their trusted devices that they rely on to provide more secure online access, thereby increasing data security for both the user and the online resources provider.

In addition, the systems and methods described herein may improve the functioning of a computing device by decreasing the overall effectiveness of potentially malicious software executing on less trustworthy computing devices and thereby correspondingly reduce any appeal of producing and disseminating malicious software. These systems and methods may also improve the field of heuristic-based computer security and/or enterprise-level security by tailoring the training of certain trustworthiness classifiers to specific organizations.

Figure 2:
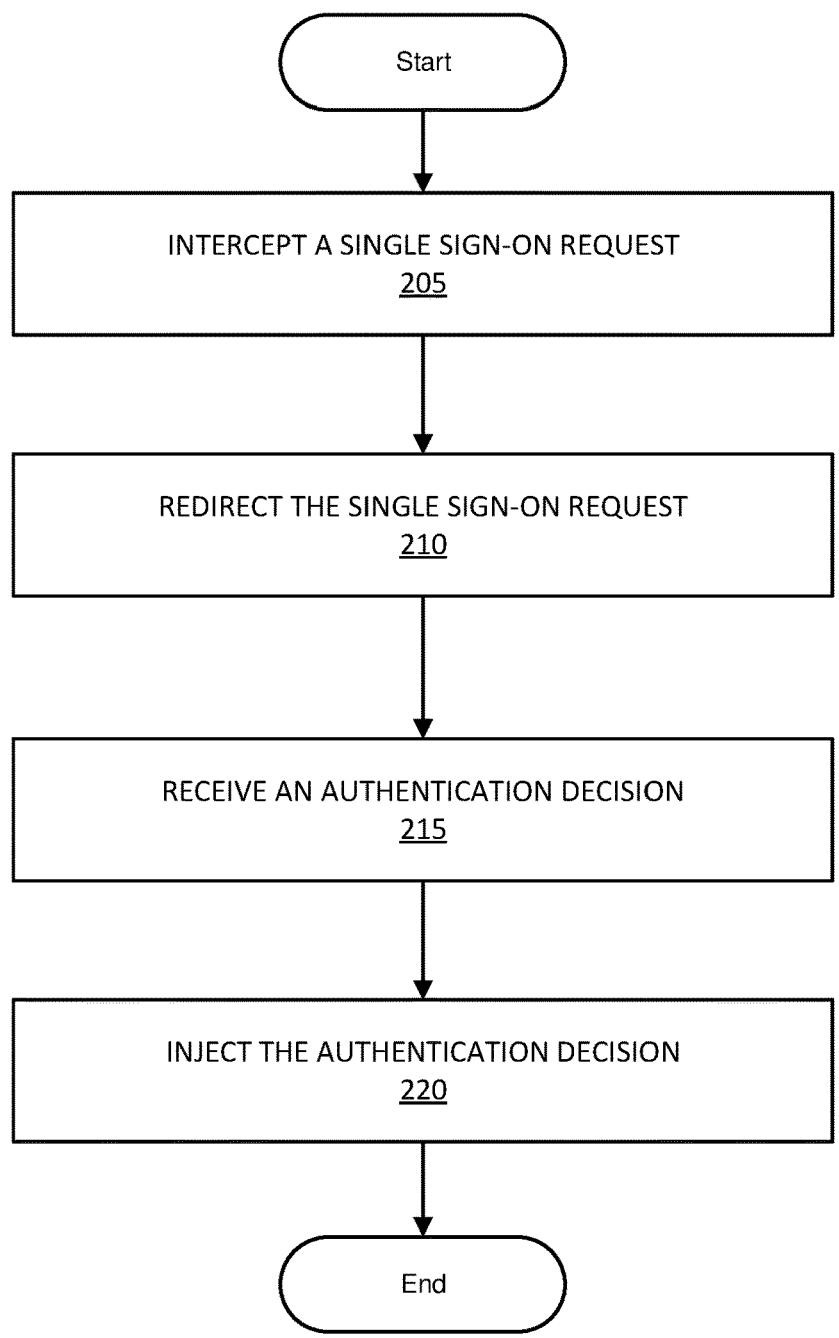
FIG. 2 is a flow diagram of an example method for providing single sign-on capability.

The following will provide, with reference to FIGS. 1 and 2, detailed descriptions of example systems for providing single sign-on capability. In addition, detailed descriptions of an example computing system and network architecture capable of implementing one or more of the embodiments described herein will be provided in connection with FIGS. 3 and 4, respectively.

FIG. 1 is a block diagram of an example system 100 for providing single sign-on capability for use by a user 105. As illustrated in this figure, example system 100 includes a computing device 110 capable of executing a first application 115 providing network-connectivity. In some embodiments, the computing device 110 is a desktop computer, however, the computing device 110 is not limited to any one particular type of computing device. Additional examples of the computing device 110 include, without limitation, laptops, tablets, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device. In some embodiments, the first application 115 provides network access to online resources. In some embodiments, the first application 115 is a web browser. In some embodiments, the first application 115 is a web browser having a single sign-on plugin for providing support for single sign-on capability as described herein.

The first application 115 executing on the computing device 110 may be communicatively coupled via a network connection 120 to a network service 125. In some embodiments, the network service 125 is a cloud-based network service. The network service 125 may be communicatively coupled through a network connection 130 to a website application program interface (API) 135 executing on a target website 140. In some embodiments, the target website 140 requires authentication of a user prior to providing access to at least one online resource. In some cases, the target website 140 is communicatively coupled via network connection 145 to an identity provider 150 for authentication purposes, however, in some cases, network connection 145 is not used or does not exist.

The identity provider 150 may receive requests for authentication of users. The identity provider 150 may also receive and compare at least one user credential against a stored value in an attempt to authenticate the user 105 in an authentication session, as described herein. In some embodiments, an identity provider application program interface (IDP API) 155 executing on the identity provider 150 may be communicatively coupled via a network connection 160 to a second application 165 executing on a separate computing device 170. In some embodiments, the separate computing device 170 is capable of executing the second application 165 for providing network-connectivity. In some embodiments, the separate computing device 170 is accessible to the user 105. In some embodiments, the separate computing device 170 is communicatively coupled with the computing device 110 via a network connection 175. Examples of the network connection 175 include, without limitation, universal serial bus (USB), Bluetooth, Wi-Fi and WiMAX.

In some embodiments, the separate computing device 170 is a mobile phone associated with the user 105, however, the separate computing device 170 is not limited to any one particular type of computing device. Additional examples of the separate computing device 170 include, without limitation, laptops, desktops, tablets, servers, mobile phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device. In some embodiments, the separate computing device 170 may represent a mobile device, a mobile telephone, a smart cover, a gateway, and/or a midpoint device. In some embodiments, the second application 165 provides network access to online resources. In some embodiments, the online resources include the identify provider 150. In some embodiments, the second application 165 is a web browser. In some embodiments, the second application 165 is a web browser having a single sign-on plugin for providing support for single sign-on capability.

In certain embodiments, one or more of the applications 115, 165 and APIs 135, 155 in FIG. 1 may represent one or more software applications or programs that, when executed by a computing device, cause the computing device to perform one or more tasks. For example, and as will be described in greater detail below, one or more of modules may represent modules stored and configured to run on one or more computing devices, such as the devices illustrated in FIG. 1, (e.g., computing device 110, separate computing device 170, target website 140 and identity provider 150). One or more of the applications 115, 165 and APIs 135, 155 in FIG. 1 may also represent all or portions of one or more special-purpose computers configured to perform one or more tasks. In some embodiments, one or more of the first computing device 110, second computing device 170, target website 140 and identity provider 150 in FIG. 1 may include an authentication component. Examples of this authentication component include, without limitation, access managers, identity managers, secure socket layer (SSL) midpoint devices, and web isolation components. Some specific examples of these authentication components include, without limitation, Symantec VIP Access Manager, from Symantec Corporation, Mountain View, Calif., and Norton Identity Safe, from Norton, a division of Symantec Corporation.

As illustrated in FIG. 1, example system 100 may also include one or more physical processors. Each physical processor generally represents any type or form of hardware-implemented processing unit capable of interpreting and/or executing computer-readable instructions. In one example, each physical processor may access and/or data stored in memory. Additionally or alternatively, each physical processor may execute one or more of modules to facilitate providing single sign-on capability. Examples of physical processor include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more online resources, such as server-supported websites. Server-supported websites generally represent any type or form of website. Examples of server-supported websites include, without limitation, the target website 140 and the identity provider 150.

By way of comparison, in conventional operation, one or more actions by the user 105 may prompt the target website 140 to request user authentication from the identity provider 150 as part of a conventional authentication session. In a conventional authentication session, the user 105 may be prompted to provide at least one user credential from the computing device 110 that the identity provider 150 may use to authenticate the user 105. Unfortunately, conventional authentication risks disclosure of the at least one user credential submitted via the computer device 110.

FIG. 2 is a flow diagram of an example computer-implemented method 200 for providing single sign-on capability. The steps shown in FIG. 2 may be performed by any suitable computer-executable code and/or computing system, including system 100 in FIG. 1 and/or variations of FIG. 1. In one example, each of the steps shown in FIG. 2 may represent an algorithm whose structure includes and/or is represented by multiple sub-steps, examples of which will be provided in greater detail below. References to specific portions of FIG. 1 with regard to the steps illustrated in FIG. 2 and described herein are intended to be taken as illustrative examples and are not intended to be limiting.

As illustrated in FIG. 2, at step 205 one or more of the systems described herein may intercept a single sign-on request. Single sign-on (SSO) may enable access to one or more systems, based on successful completion of an authentication session according to a single sign-on supporting protocol, initiated in response to a user request or action. Some examples of an authentication session employing a single sign-on supporting protocol include, without limitation, Security Assertion Markup Language (SAML), OpenID, OpenID Connect, OpenSSO, OAuth and WS-Federation. The systems described herein may perform step 205 in a variety of ways. In one illustrative example with reference to FIG. 1, the user 105 desires to access, with the computing device 110, an online resource, such as the target website 140. When the user 105 attempts to access the online resource, an authentication request from the target website 140 is transmitted back to the first application 115 executing on the computing device 110 to enable the computing device 110 to begin an authentication session. Alternatively, in some cases, when the user 105 attempts to access the online resource, the target website 140 initially accesses the identity provider 150 via network connection 145, and then transmits the authentication request from the target website 140 back to the first application 115 executing on the computing device 110 to begin an authentication session. In some embodiments, the user may consider the computing device 110 (which may not be under the control of the user 105) to be less trustworthy than the separate computer device 170 (which may be controlled by the user). For example, the computer device 110 may represent a public-use computer in a public location, while the separate computing device 170 may represent the user's mobile phone.

In some embodiments, the first application 115 provides a user-selectable option to have the single sign-on request redirected from the computing device 110 to the separate computing device 170 for execution. In some embodiments, the first application 115 executing on the computing device 110 recognizes the second application 165 executing on the separate computing device 170 as having previously been selected by the user 105 to have single sign-on requests redirected to the separate computing device for execution. In some embodiments, the first application 115 recognizes the second application 165 via a Bluetooth connection.

In some embodiments, at step 205 the first application 115 intercepts a single sign-on request that otherwise would have been passed through the network service 125 to the target website 140 for authentication with the identity provider 150.

At step 210 one or more of the systems described herein may redirect the single sign-on request. The systems described herein may perform step 210 in a variety of ways. In one illustrative example with reference to FIG. 1, the first application 115 executing on the computing device 110 redirects the single sign-on request to the second application 165 executing on the separate computing device 170. In some embodiments, receipt of the redirected single sign-on request by the second computing device 170 causes the second computing device 170 to participate in an authentication session with the identity provider 150 via network connection 160. In some embodiments, the authentication session may include the identity provider 150, through its IDP API 155, requesting at least one user credential from the second application executing on the separate computing device 170. In some embodiments, the user 105 is prompted to enter the at least one user credential into the separate computing device 170. The term "user credential" as used herein, may refer to information associated with the user. Examples of "user credential" include, without limitation, a user identification, a password, a biometric, a one-time password (OTP) and a quick response (QR) code. In some embodiments, the at least one user credential from the separate computing device 170 is transmitted on the network connection 160 using a protocol, such as Security Assertion Markup Language (SAML), OpenID, OpenID Connect, OpenSSO, OAuth and WS-Federation, without limitation. In some alternative embodiments, the step of redirecting the single sign-on request is performed by the network service 125, e.g., a cloud-based service, instead of the computing device 110.

The user credential may be transmitted from the second application 165 executing on the separate computing device 170 to the IDP API 155 executing on the identity provider 150 via the network connection 160. The identity provider 150 may receive and compare the at least one user credential against a stored value in an attempt to authenticate the user 105 in the authentication session to derive an authentication decision At step 215 one or more of the systems described herein receive the authentication decision. The systems described herein may perform step 215 in a variety of ways. In one illustrative example with reference to FIG. 1, the second application 165 executing on the separate computing device 170 receives the authentication decision from the IDP API 155 executing on the identity provider 150 via the network connection 160. In some embodiments, the authentication decision includes a digitally signed assertion. An example of a digitally signed assertion includes, without limitation, a digital certificate. In some embodiments, the authentication decision may indicate that an unrecognized user credential was received by the identity provider 150. In that situation, when the user credential is unrecognized, the authentication decision may not include a digitally signed assertion.

At step 220 one or more of the systems described herein inject the authentication decision. The systems described herein may perform step 220 in a variety of ways. In one illustrative example with reference to FIG. 1, the second application 165 executing on the separate computing device 170 injects the authentication decision back into to the first application 115 executing on the computing device 110 via the network connection 175. In some embodiments, the computing device 110 then has the authentication decision, including a digitally signed assertion, to enable access of at least one online resource controlled by the target website 140, even though the user 105 did not enter at least one user credential into the computing device 110. Thus, the risk of exposure of at least one user credential on the computing device 110 has been avoided.

As described in detail herein, for example, within the description associated with the components illustrated in FIG. 1 and the steps illustrated in FIG. 2, the present disclosure describes improved systems and methods for providing single sign-on capability. In one example, a request for single sign-on may be intercepted by the computing device 110 and redirected to the separate computing device 170 for execution in an authentication session. Authentication may then be performed and successfully completed using the separate computing device 170 to submit at least one user credential instead using the computing device 110. An authentication decision that the separate computing device 170 obtains from the identity provider (IDP) 150 may then be injected back into the computing device 110 where the single sign-on request originated to complete authentication. If the authentication session completed successfully, the user 105 will have access to an online resource from the computing device 110 enabled by at least one user credential received from the separate computing device 170. If the authentication session completed unsuccessfully, the user 105 will not have access to the online resource from the computing device 110. Regardless of whether the authentication session completed successfully or unsuccessfully, the at least one user credential is not provided or exposed to the computing device 110. Because the user 105 may have less control over the computing device 110 than the separate computing device 170, the systems and methods described herein may enable the user 105 to access an online resource with a similar confidence that the user has in the separate computing device 170 even though access to the online resource is via the computing device 110 that may be perceived by the user as being less trustworthy. By redirecting authentication to the separate computing device 170 that the user may perceive as being more secure, the risk of exposure of the at least one user credential is correspondingly reduced, thus providing a more secure computing environment and reducing the opportunities for malicious software.

Figure 3:
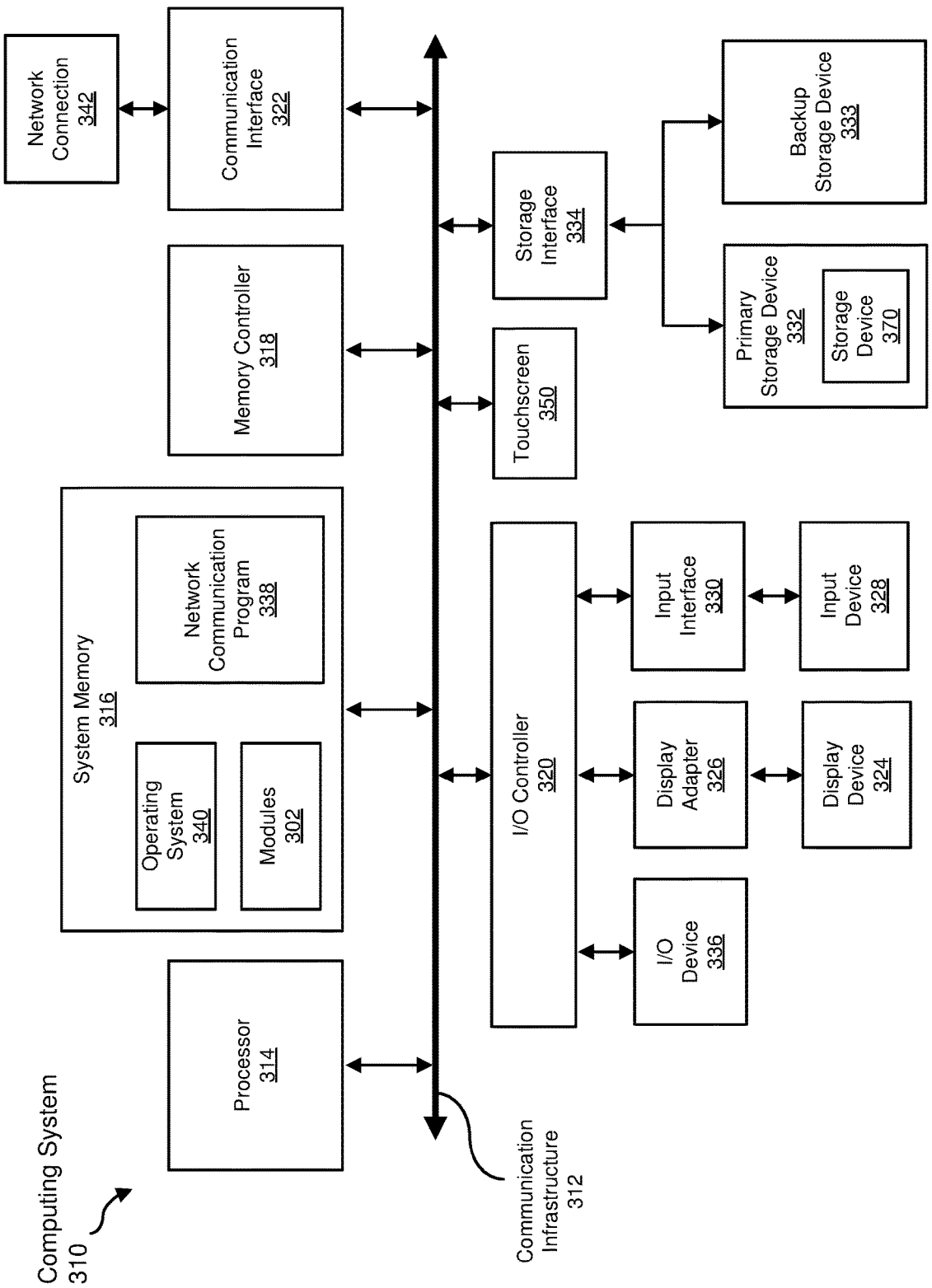
FIG. 3 is a block diagram of an example computing system capable of implementing one or more of the embodiments described and/or illustrated herein.

FIG. 3 is a block diagram of an example computing system 310 capable of implementing one or more of the embodiments described and/or illustrated herein. For example, all or a portion of computing system 310 may perform and/or be a means for performing, either alone or in combination with other elements, one or more of the steps described herein (such as one or more of the steps illustrated in FIG. 2). All or a portion of computing system 310 may also perform and/or be a means for performing any other steps, methods, or processes described and/or illustrated herein.

Computing system 310 broadly represents any single or multi-processor computing device or system capable of executing computer-readable instructions. Examples of computing system 310 include, without limitation, workstations, laptops, client-side terminals, servers, distributed computing systems, handheld devices, or any other computing system or device. In its most basic configuration, computing system 310 may include at least one processor 314 and a system memory 316.

Processor 314 generally represents any type or form of physical processing unit (e.g., a hardware-implemented central processing unit) capable of processing data or interpreting and executing instructions. In certain embodiments, processor 314 may receive instructions from a software application or module. These instructions may cause processor 314 to perform the functions of one or more of the example embodiments described and/or illustrated herein.

System memory 316 generally represents any type or form of volatile or non-volatile storage device or medium capable of storing data and/or other computer-readable instructions. Examples of system memory 316 include, without limitation, Random Access Memory (RAM), Read Only Memory (ROM), flash memory, or any other suitable memory device. Although not required, in certain embodiments computing system 310 may include both a volatile memory unit (such as, for example, system memory 316) and a non-volatile storage device (such as, for example, primary storage device 332, as described in detail below). In one example, one or more of modules 302 may be loaded into system memory 316.

In some examples, system memory 316 may store and/or load an operating system 340 for execution by processor 314. In one example, operating system 340 may include and/or represent software that manages computer hardware and software resources and/or provides common services to computer programs and/or applications on computing system 310. Examples of operating system 340 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 310 may also include one or more components or elements in addition to processor 314 and system memory 316. For example, as illustrated in FIG. 3, computing system 310 may include a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an Industry Standard Architecture (ISA), Peripheral Component Interconnect (PCI), PCI Express (PCIe), or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage interface 334.

As illustrated in FIG. 3, computing system 310 may also include at least one display device 324 coupled to I/O controller 320 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 3, example computing system 310 may also include at least one input device 328 coupled to I/O controller 320 via an input interface 330. Input device 328 generally represents any type or form of input device capable of providing input, either computer or human generated, to example computing system 310. Examples of input device 328 include, without limitation, a keyboard, a pointing device, a speech recognition device, variations or combinations of one or more of the same, and/or any other input device.

Additionally or alternatively, example computing system 310 may include additional I/O devices. For example, example computing system 310 may include I/O device 336. In this example, I/O device 336 may include and/or represent a user interface that facilitates human interaction with computing system 310. Examples of I/O device 336 include, without limitation, a computer mouse, a keyboard, a monitor, a printer, a modem, a camera, a scanner, a microphone, a touchscreen device 350, variations or combinations of one or more of the same, and/or any other I/O device.

Communication interface 322 broadly represents any type or form of communication device or adapter capable of facilitating communication between example computing system 310 and one or more additional devices. For example, in certain embodiments communication interface 322 may facilitate communication between computing system 310 and a private or public network including additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 322 may also allow computing system 310 to engage in distributed or remote computing. For example, communication interface 322 may receive instructions from a remote device or send instructions to a remote device for execution.

In some examples, system memory 316 may store and/or load a network communication program 338 for execution by processor 314. In one example, network communication program 338 may include and/or represent software that enables computing system 310 to establish a network connection 342 with another computing system (not illustrated in FIG. 3) and/or communicate with the other computing system by way of communication interface 322. In this example, network communication program 338 may direct the flow of outgoing traffic that is sent to the other computing system via network connection 342. Additionally or alternatively, network communication program 338 may direct the processing of incoming traffic that is received from the other computing system via network connection 342 in connection with processor 314.

Although not illustrated in this way in FIG. 3, network communication program 338 may alternatively be stored and/or loaded in communication interface 322. For example, network communication program 338 may include and/or represent at least a portion of software and/or firmware that is executed by a processor and/or Application Specific Integrated Circuit (ASIC) incorporated in communication interface 322.

As illustrated in FIG. 3, example computing system 310 may also include a primary storage device 332 and a backup storage device 333 coupled to communication infrastructure 312 via a storage interface 334. Storage devices 332 and 333 generally represent any type or form of storage device or medium capable of storing data and/or other computer-readable instructions. For example, storage devices 332 and 333 may be a magnetic disk drive (e.g., a so-called hard drive), a solid state drive, a floppy disk drive, a magnetic tape drive, an optical disk drive, a flash drive, or the like. Storage interface 334 generally represents any type or form of interface or device for transferring data between storage devices 332 and 333 and other components of computing system 310. In one example, a separate storage device 370 may be stored and/or loaded in primary storage device 332.

In certain embodiments, storage devices 332 and 333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 332 and 333 may also include other similar structures or devices for allowing computer software, data, or other computer-readable instructions to be loaded into computing system 310. For example, storage devices 332 and 333 may be configured to read and write software, data, or other computer-readable information. Storage devices 332 and 333 may also be a part of computing system 310 or may be a separate device accessed through other interface systems.

Many other devices or subsystems may be connected to computing system 310. Conversely, all of the components and devices illustrated in FIG. 3 need not be present to practice the embodiments described and/or illustrated herein. The devices and subsystems referenced above may also be interconnected in different ways from that shown in FIG. 3. Computing system 310 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 310 may be configured as an Application Specific Integrated Circuit (ASIC) adapted to implement one or more of the example embodiments disclosed herein.

Figure 4:
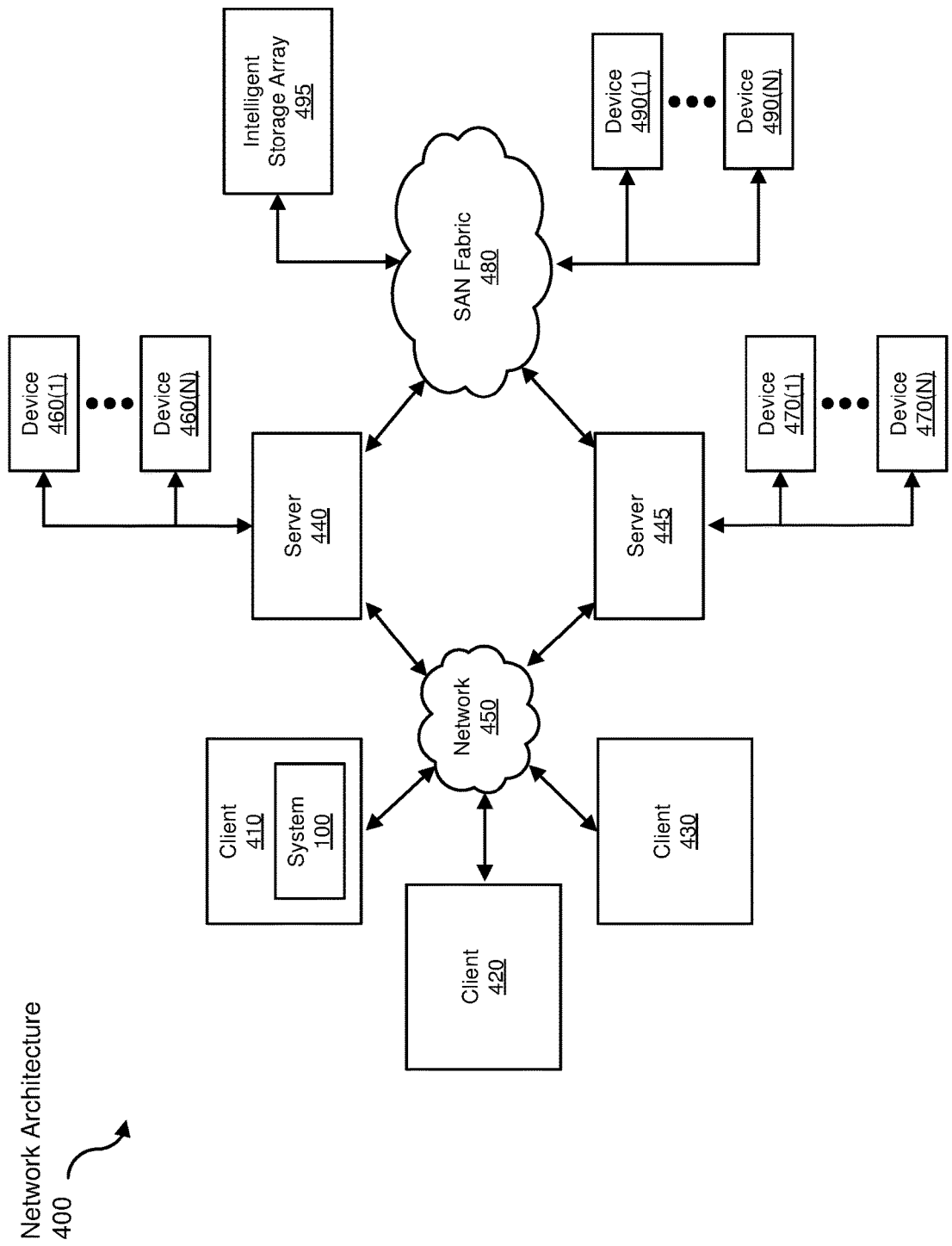
FIG. 4 is a block diagram of an example computing network capable of implementing one or more of the embodiments described and/or illustrated herein.

FIG. 4 is a block diagram of an example network architecture 400 in which client systems 410, 420, and 430 and servers 440 and 445 may be coupled to a network 450. As detailed above, all or a portion of network architecture 400 may perform and/or be a means for performing, either alone or in combination with other elements, one or more of the steps disclosed herein (such as one or more of the steps illustrated in FIG. 2). All or a portion of network architecture 400 may also be used to perform and/or be a means for performing other steps and features set forth in the instant disclosure.

Client systems 410, 420, and 430 generally represent any type or form of computing device or system, such as example computing system 310 in FIG. 3. Similarly, servers 440 and 445 generally represent computing devices or systems, such as application servers or database servers, configured to provide various database services and/or run certain software applications. Network 450 generally represents any telecommunication or computer network including, for example, an intranet, a WAN, a LAN, a PAN, or the Internet. In one example, client systems 410, 420, and/or 430 and/or servers 440 and/or 445 may include all or a portion of system 100 from FIG. 1.

As illustrated in FIG. 4, one or more storage devices 460(1)-(N) may be directly attached to server 440. Similarly, one or more storage devices 470(1)-(N) may be directly attached to server 445. Storage devices 460(1)-(N) and storage devices 470(1)-(N) generally represent any type or form of storage device or medium capable of storing data and/or other computer-readable instructions. In certain embodiments, storage devices 460(1)-(N) and storage devices 470(1)-(N) may represent Network-Attached Storage (NAS) devices configured to communicate with servers 440 and 445 using various protocols, such as Network File System (NFS), Server Message Block (SMB), or Common Internet File System (CIFS).

Servers 440 and 445 may also be connected to a Storage Area Network (SAN) fabric 480. SAN fabric 480 generally represents any type or form of computer network or architecture capable of facilitating communication between a plurality of storage devices. SAN fabric 480 may facilitate communication between servers 440 and 445 and a plurality of storage devices 490(1)-(N) and/or an intelligent storage array 495. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 460(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to example computing system 310 of FIG. 3, a communication interface, such as communication interface 322 in FIG. 3, may be used to provide connectivity between each client system 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 460(1)-(N), storage devices 470(1)-(N), storage devices 490(1)-(N), or intelligent storage array 495. Although FIG. 4 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 440, server 445, storage devices 460(1)-(N), storage devices 470(1)-(N), storage devices 490(1)-(N), intelligent storage array 495, or any combination thereof. All or a portion of one or more of the example embodiments disclosed herein may also be encoded as a computer program, stored in server 440, run by server 445, and distributed to client systems 410, 420, and 430 over network 450.

As detailed above, computing system 310 and/or one or more components of network architecture 400 may perform and/or be a means for performing, either alone or in combination with other elements, one or more steps of an example method for providing single sign-on capability.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing single sign-on capability, at least a portion of the method being performed by a computing device comprising at least one processor, the method comprising:
    providing a user-selectable option to have a single sign-on request redirected from the computing device to a separate computing device for execution, wherein the computing device comprises a user device and the separate computing device comprises another user device that receives at least one user credential to authenticate the computing device utilizing the single sign-on request;
    intercepting, during an authentication session with a network resource, the single sign-on request generated by an application executing on the computing device;
    redirecting the single sign-on request to the separate computing device for execution;
    receiving, in response to authentication of the at least one user credential from the separate computing device, an authentication decision that the separate computing device obtained from an identity provider (IDP) by executing the single sign-on request, wherein the at least one user credential is not exposed to the computing device; and
    injecting the authentication decision received from the separate computing device into the application where the single sign-on request was originally generated to complete the authentication session.

2. The computer-implemented method of claim 1, further comprising:
    redirecting encrypted data from the separate computing device to a web browser executing on the computing device.

3. The computer-implemented method of claim 1, wherein the at least one user credential comprises at least one of a user identification, a password, a biometric, a one-time password (OTP), and a quick response (QR) code.

4. The computer-implemented method of claim 1, wherein the separate computing device comprises at least one of a mobile device, a mobile telephone, a smart cover, a gateway, and a midpoint device.

5. The computer-implemented method of claim 4, wherein the separate computing device includes an authentication component, and the authentication component comprises at least one of an access manager, an identity manager, a secure socket layer (SSL) midpoint device, and a web isolation component.

6. The computer-implemented method of claim 1, wherein the step of redirecting the single sign-on request is performed by a cloud-based service.

7. The computer-implemented method of claim 1, wherein the at least one user credential from the separate computing device uses a protocol, the protocol comprising at least one of Security Assertion Markup Language (SAML), OpenID, OpenID Connect, OpenSSO, OAuth, and WS-Federation.

8. The computer-implemented method of claim 1, wherein the authentication decision comprises a digitally signed assertion.

9. The computer-implemented method of claim 1, wherein the user device comprises a public-use computer in a public location.

10. A system for providing single sign-on capability, the system comprising:
    at least one physical processor; and
    physical memory comprising computer-executable instructions that, when executed by the physical processor, cause the physical processor to:
        provide a user-selectable option to have a single sign-on request redirected from the physical processor to a separate computing device for execution, wherein the physical processor comprises a user device and the separate computing device comprises another user device that receives at least one user credential to authenticate the user device utilizing the single sign-on request;
        intercept, during an authentication session with a network resource, the single sign-on request generated by an application executed by the physical processor;
        redirect the single sign-on request to the separate computing device for execution;
        receive, in response to authentication of the at least one user credential from the separate computing device, an authentication decision that the separate computing device obtained from an identity provider (IDP) by executing the single sign-on request, wherein the at least one user credential is not exposed to the user device; and
        inject the authentication decision received from the separate computing device into the application where the single sign-on request was originally generated to complete the authentication session.

11. The system of claim 10, wherein the computer-executable instructions further cause the separate computing device to redirect encrypted data from the separate computing device to a web browser executing on the system.

12. The system of claim 10, wherein the at least one user credential comprises at least one of a user identification, a password, a biometric, a one-time password (OTP) and a quick response (QR) code.

13. The system of claim 10, wherein the separate computing device comprises at least one of a mobile device, a mobile telephone, a smart cover, a gateway, a midpoint device.

14. The system of claim 13, wherein the separate computing device includes an authentication component, and the authentication component comprises at least one of an access manager, an identity manager, a secure socket layer (SSL) midpoint device, and a web isolation component.

15. The system of claim 10, wherein the step of redirecting the single sign-on request is performed by a cloud-based service.

16. The system of claim 10, wherein the at least one user credential from the separate computing device uses a protocol, the protocol comprising at least one of Security Assertion Markup Language (SAML), OpenID, OpenID Connect, OpenSSO, OAuth and WS-Federation.

17. The system of claim 10, wherein the authentication decision comprises a digitally signed assertion.

18. The system of claim 10, wherein the user device comprises a public-use computer in a public location.

19. A non-transitory computer-readable medium comprising one or more computer-executable instructions that, when executed by at least one processor of a computing device, cause the computing device to:

provide a user-selectable option to have a single sign-on request redirected from the computing device to a separate computing device for execution, wherein the computing device comprises a user device and the separate computing device comprises another user device that receives at least one user credential to authenticate the computing device utilizing the single sign-on request;

intercept, during an authentication session with a network resource, the single sign-on request generated by an application executing on the computing device;

redirect the single sign-on request to the separate computing device for execution;

receive, in response to authentication of the at least one user credential from the separate computing device, an authentication decision that the separate computing device obtained from an identity provider (IDP) by executing the single sign-on request, wherein the at least one user credential is not exposed to the computing device; and inject the authentication decision received from the separate computing device into the application where the single sign-on request was originally generated to complete the authentication session.

20. The non-transitory computer-readable medium of claim 19, wherein the user device comprises a public-use computer in a public location.

* * * * *